Nov. 14, 1933.  V. P. WRITER  1,935,282
MACHINE AND METHOD FOR MAKING HATS
Filed Jan. 4, 1930  2 Sheets-Sheet 1
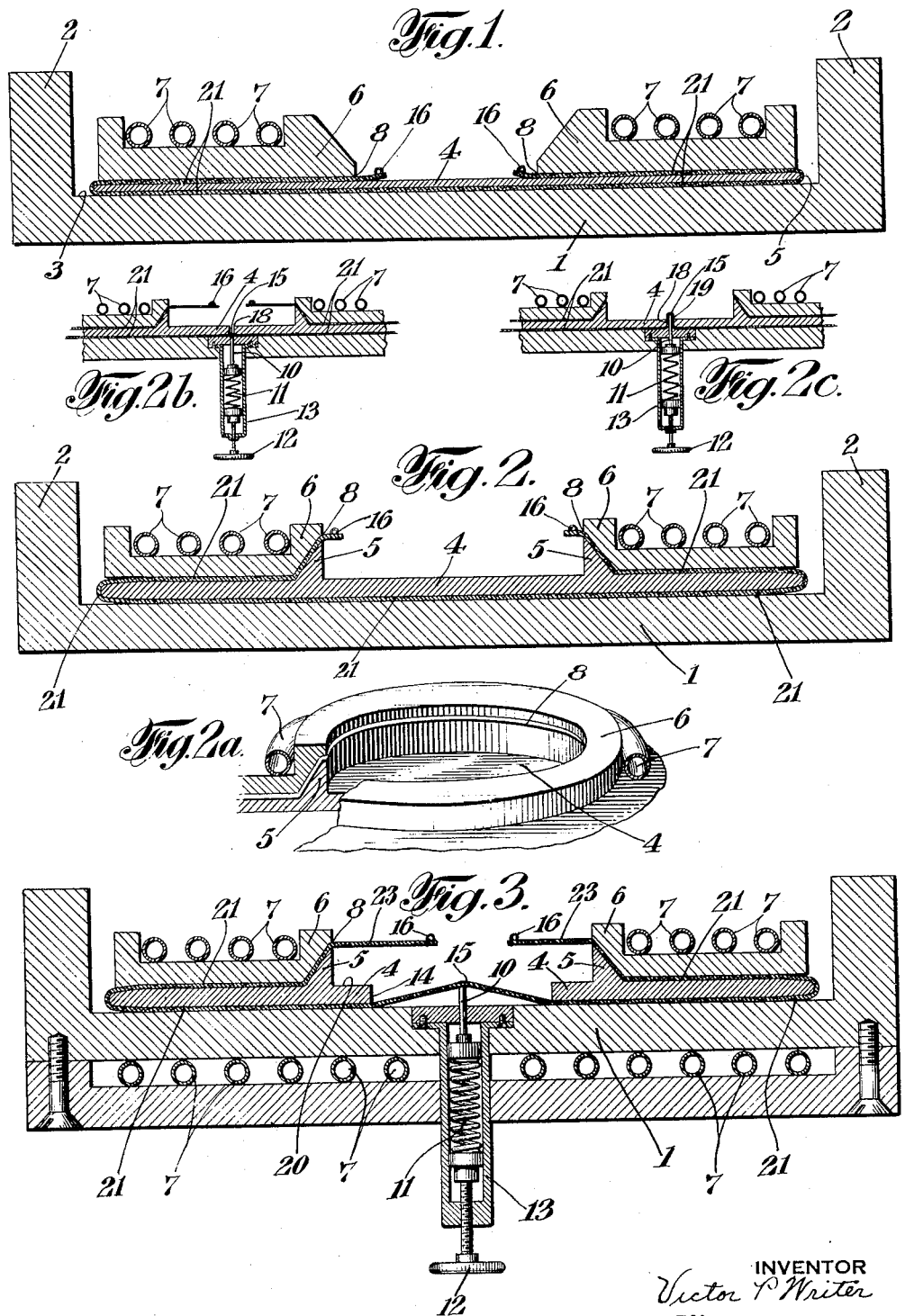

Nov. 14, 1933.  V. P. WRITER  1,935,282

MACHINE AND METHOD FOR MAKING HATS

Filed Jan. 4, 1930   2 Sheets-Sheet 2

INVENTOR
Victor P. Writer
BY
Kenyon Kenyon
ATTORNEY

Patented Nov. 14, 1933

1,935,282

UNITED STATES PATENT OFFICE 1,935,282

MACHINE AND METHOD FOR MAKING HATS

Victor P. Writer, New York, N. Y.

Application January 4, 1930. Serial No. 418,461

18 Claims. (Cl. 223—31)

This invention relates to means and a method for the manufacture of hats, and relates particularly to the manufacture of the style of hats known as tam o'shanters or berets. It will be described with particular reference to the manufacture of berets.

In the manufacture of hats of the type mentioned, especially when made out of non-woven cloth such as matted felt, or the like, it has been impossible to obtain a satisfactory beret made from a single piece of cloth except by slow hand methods of shaping which have been laborious and impracticable. I have heretofore discovered that satisfactory and rapid results in the manufacture of one piece berets can be obtained by means of the machine and method disclosed and claimed in Letters Patent of the United States No. 1,725,500 issued to me on August 20, 1929. The present invention relates to improvements upon the machine disclosed in the patent above referred to and a further improvement in the method of manufacture therein disclosed.

It is an object of the present invention to provide means whereby berets may be more rapidly fashioned, may be produced in a greater variety of textures and materials, and whereby the method of manufacture is very greatly speeded up and facilitated with accompanying improvement and standardization of the finished product. It is also an object of the present invention so to improve upon the process disclosed in my prior Letters Patent above referred to as to accomplish other objects hereinafter set forth.

In the drawings which accompany this specification similar (though not always identical) parts are designated by the same reference numerals throughout.

Fig. 1 is a cross-section of one form of my beret making machine.

Fig. 2 is a cross-section of a second form of my beret making machine.

Fig. 2a is a perspective view, partially cut away, of a portion of the device shown in Fig. 2.

Figs. 2b and 2c are cross-sections on a somewhat reduced scale of a modified form of the device of Fig. 2, showing two successive stages of manufacture.

Figs. 3, 4 and 5 are cross-sections of a third form of my beret making machine, the three figures referred to showing the machine at three successive stages in the process of manufacture.

Figure 4:
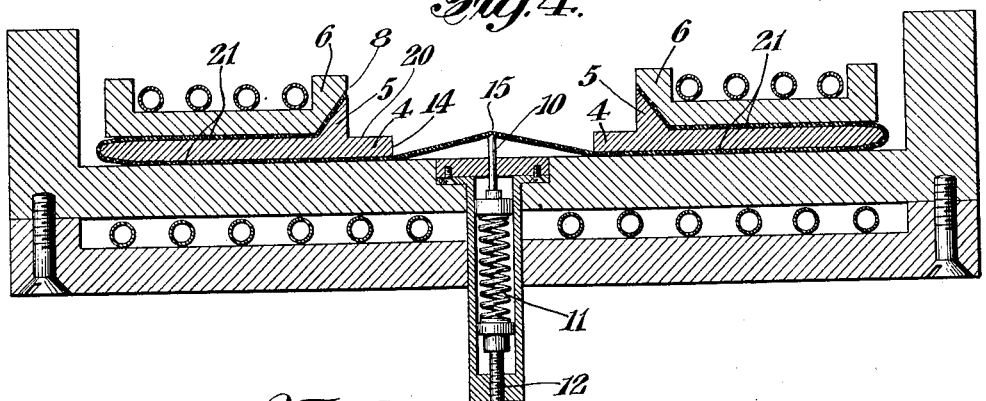

In its simplest form, my beret making machine is shown in cross-section in Fig. 1. The lower die 1, supported by any suitable stand such for example as the stand shown in my issued patent above referred to, has an upstanding flange 2 defining its marginal edge and provides a flat contacting surface 3 upon which the cloth rests during the pressing operation. The shaping element 4 is, in the simplest form of my device, a flat circular disc having sufficient thickness at the edges to prevent injury to the cloth at the point of flexure and to permit it to move smoothly over the edges at the point 5 when the pulling and stretching operation takes place.

The upper die 6, 6 is annular in shape and contains a central opening as shown in Fig. 1, the size of which determines the head size of the hat which is to be made by the machine. Either or both of the dies, upper and lower, may be heated in any desired way. In ordinary practise I heat both by steam coils. In Fig. 1 I have shown steam coils 7, 7 arranged to heat the upper die 6. It will be understood that similar coils (not shown) may be employed to heat the lower die 1 (for example, in the manner suggested by Fig. 3) or any other method of heating, such as gas or electricity, may be resorted to with respect to either the upper or the lower dies.

Figure 7:
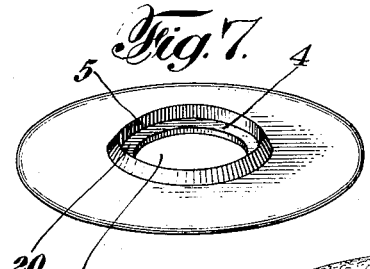
Fig. 7 shows in perspective the forming element 4 of Figs. 3, 4 and 5.

Another form of my invention is shown in Fig. 2 wherein the lower die 1, having an upstanding marginal flange 2, is the same as shown in Fig. 1. In Fig. 2, however, the forming element 4 and the upper die 6, 6 have been modified. The forming element 4 in this form of the invention is provided on its upper face with an upstanding circular wall 5, 5 concentric with its center and of a size adapted to produce the desired head size of the finished hat. The circular wall is shown in perspective at 5 of Fig. 7 (though in connection with a forming element differing in other respects). The outer face of this wall forms an obtuse angle of about 135°, more or less, with respect to the plane of the upper surface of the forming element, as seen in cross-section in Fig. 2. The inner face of this wall is, as seen in Fig. 2, vertical with respect to the plane of the upper surface of the forming element, though the angle of either face of the wall with respect to the plane of the upper surface of the forming element may be modified within wide limits within the spirit of my invention. The upper die 6,6 is shaped on its under surface to conform to the shape of the forming element as shown in Figs. 2 and 2a, in such a way that a slot-like aperture is formed at 8 when the upper die and forming element are brought into register with each other. This aperture extends around the entire inner periphery of the well-like opening defined by the circular wall of the forming element as best seen in Fig. 2a. This aperture or slot 8 in the wall of the well permits the rapid and effective use of a knife or other cutting edge to cut away waste after the material of the beret has been drawn and pulled in the manner below described. It is, of course, immaterial whether the wall of the well be vertical or at some angle other than 90° with respect to the floor of the well, provided only that an angle be selected which permits convenient application of the cutting edge.

Figure 6:
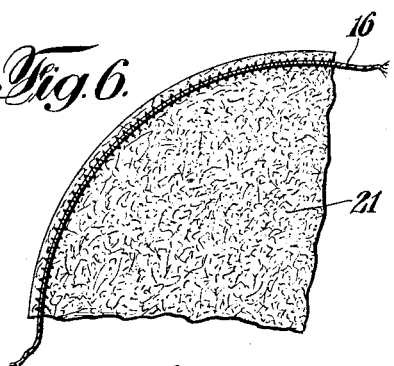
Fig. 6 shows the method of affixing the drawstring around the circumference of the cloth blank from which the beret is to be made.

The method of operation employed in connection with the form of my invention shown in Figs. 1 and 2 is as follows: A circular cloth blank 21 of the desired material is cut of a suitable size and a drawstring or slip-cord 16 is attached around the periphery thereof by a crisscross stitch shown in plan view in Fig. 6 and in cross-section at 16 of Figs. 1, 2 and 3. This material, while still dry, is drawn as tightly as may be upon a forming element, as suggested in Fig. 8, by pulling tight the slip-cord 16. The material is then dampened with water and inserted between the dies in the machine which have been heated. The upper and lower dies are then brought into engagement with the material upon the former as shown in Figs. 1 and 2. Any means or method of causing these dies to exert pressure upon the cloth and forming element between them may be employed. One such means and method, comprising a foot lever adapted for vertical movement and operating the upper die or shaping plate, is described in my issued patent, above referred to. When the upper and lower dies have thus been brought into engagement with the forming element as shown in Figs. 1 and 2, the drawstring 16 is manually tightened still further by the operator who works through the opening in the upper die and thus, in the presence of moisture and heat, the cloth 21 is pulled upwardly and radially inward over the periphery of the former 4 toward its center. The effect of moisture and heat causes the material to stretch to a substantial degree when pulled by the drawstring and this stretching is an important feature of my method of making berets. Hence the use of the drawstring is an important feature of the invention as it gives noticeably greater speed and efficiency to the entire operation. After the pulling has been completed the cloth is left in the press for a suitable length of time to facilitate drying the cloth and to permit it to acquire a proper set. This process, I have found, has the effect of causing all the wrinkles to concentrate in the waste material in the center opening and to leave a smooth surface elsewhere on the upper and lower surfaces of the forming element. After a suitable length of time, which may be from three to ten minutes, a sharp cutting edge is applied at the point 8,8 to sever the waste material gathered in the center of the press and in which all of the wrinkles have been concentrated. With some kinds of cloth materials, the cutting may be done immediately at the conclusion of the pulling operation, and before drying of the cloth is complete. When the cloth has become sufficiently dry, it is released from the pressure of the upper and lower dies and taken off the forming element. It will then have impressed in it a flange or upstanding margin around the head opening as seen at 22 in Fig. 9. This is then turned back upon the face of the cloth as shown by small arrows at 9,9 on Fig. 9 (ordinarily after the insertion of a suitable elastic band) and sewed in place as indicated by dotted lines in Fig. 9. The beret is then turned inside out and a pigtail, heretofore fashioned by hand out of waste cloth material, is affixed by hand to the top of the beret at its center point (compare Fig. 10).

Figure 8:
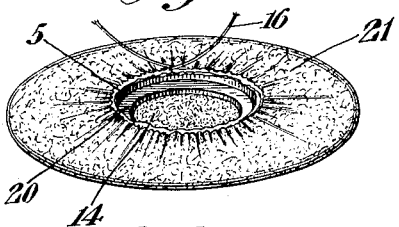
Fig. 8 shows in perspective the cloth 21 of Fig. 6 drawn about the forming element 4 of Fig. 7, prior to insertion thereof in the press.

It is a particular feature of the form of the invention referred to in connection with Fig. 2 and elsewhere, that the margin of the cloth blank is drawn radially inward over the forming disc or element 4 and over the wall 5 having the edge shown at 8, and is held in this position tensioned radially inward from the point of flexure at the periphery of the forming disc 4. Thereafter the tensioned cloth, which occupies a roughly conical position as seen in Fig. 8, is depressed and deflected along this edge 8 in the presence of heat and moisture to form a mark or fold in the material corresponding to the edge. This mark or fold serves to furnish a convenient cutting guide when cutting away the waste material along or adjacent to this mark or fold, and also to aid in a subsequent step of manufacture if desired. This edge may be circular or oval or otherwise as desired, but it will ordinarily be a continuous edge roughly concentric with the peripheral outline of the forming element with which it is used.

Figure 5:
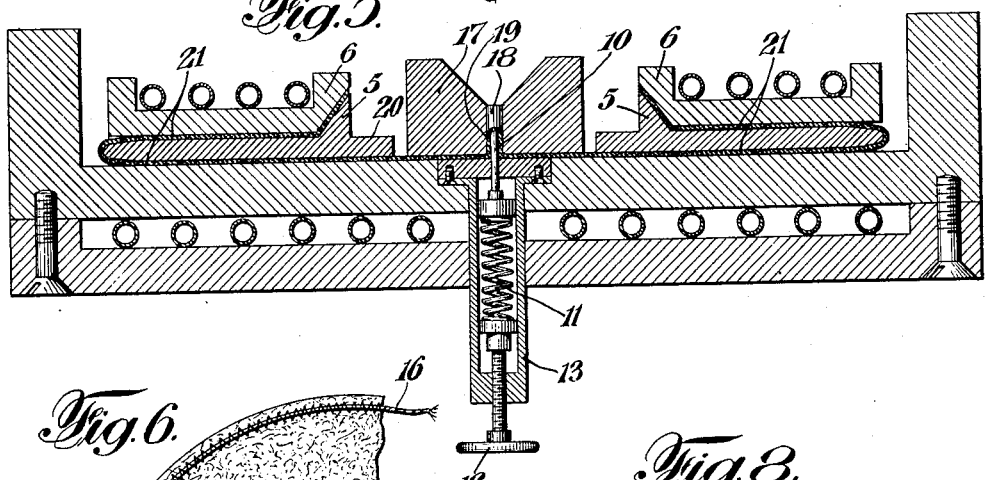

In the form of the invention shown in Figs. 3, 4 and 5, in addition to the other features hereinbefore described, the pigtail is automatically formed integral with the material during the process of manufacture and need not subsequently be made and affixed by hand. In Fig. 3 the lower die 1 is here shown, for convenience, with steam coils 7, 7 inserted. It will be understood that this method of heating the lower die is one of the methods applicable to heating the lower dies of Figs. 1 and 2. In Fig. 3, however, there is inserted in the center of the lower die a vertical pin 10 projecting upwards through the face of the lower die 1 to a suitable height which may conveniently be about one-half inch. The pin 10 is supported from below by a coil spring 11 whose tension is adjustably controlled by the thumb screw 12. The pin and spring assembly is suitably encased in a tube 13. The forming element 4 to be used with the form of apparatus described in Fig. 3 is shown in perspective in Fig. 7 and in cross-section in Figs. 3, 4 and 5. It is perforated by a central opening 14 so that it, like the upper die, is annular in shape. In other respects it is the same as the forming element 4 shown in Fig. 2, having an upstanding wall 5 adapted to register suitably with the upper die 6 in the same manner as shown in Figs. 2 and 2a. A ledge 20 is left at the foot of the inner face of the wall 5 sufficient to prevent the blade of the knife or other cutting edge applied along the slot 8 from coming in contact with, or in any way injuring, the layer of cloth in contact with the lower die 1.

Figure 9:
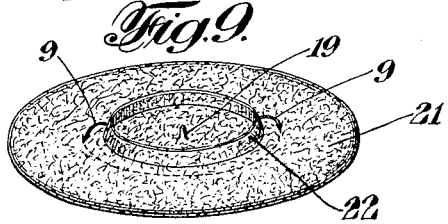
Fig. 9 shows in perspective the appearance and shape of the cloth as it comes from the machine and after the forming element has been removed from within it. Dotted lines indicate a subsequent sewing operation.
Figure 10:
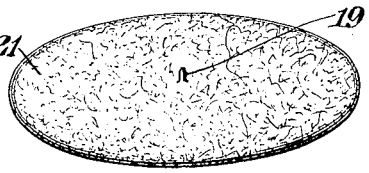
Fig. 10 shows in perspective the upper side of a finished beret, showing the pigtail.

The method of operation employed in connection with the form of my invention shown in Fig. 3 is as follows: The cloth blank is cut and a drawstring affixed to it in the manner described above (see Fig. 6). The cloth 21 is then drawn tightly about the forming element 4 as shown in Fig. 8, is then dampened with water, and inserted in the press. The upper and lower dies are then brought into engagement with the forming element as shown in cross-section in Fig. 3. When this point has been reached it will be noted that the upwardly projecting pin 10 supports the cloth 21 in a conical or tent-like position as shown at 15 in Fig. 3. The tension of the spring is so adjusted that the pin will depress sufficiently to prevent puncturing or injuring the material at the point 15. The drawstring 16 is then pulled by the hand of the operator with accompanying stretching of the material radially and inwardly and slippage thereof over the edge of the forming element, as above described. It is probable that some further depression of the pin 10 may take place during this operation. Next, the surplus waste material concentrated within the well of the forming element (shown at 23 in Fig. 3) is cut away by a knife or other cutting edge as shown in Fig. 4. Next, a cylindrical metal block 17 having a central opening 18 is placed upon the material held in conical position at 15 by the pin 10 and is permitted to press down the material over the pin 10 as shown in Fig. 5. The weight of the cylindrical block 17 and the tension of the spring 11 may each be so adjusted that the cloth is pressed downwardly over the pin 10 by the orifice 18 and, under the influence of heat and moisture, a small upward projection is thus formed in the material of the hat of suitable size and shape for a pigtail 19. At the conclusion of the drying and setting period, the cylindrical block 17 is removed and the cloth is taken out of the machine and removed from the forming element. It then appears as shown in Fig. 9, the pigtail 19 rising vertically from the center of the inner surface of the hat in the center of the head orifice. The marginal flange 22 is then turned outwardly, as shown at 9 in Fig. 9, over suitable elastic material and sewed in the position indicated by dotted lines in Fig. 9. The beret is then turned right side out, thus bringing the pigtail on the top thereof as shown in Fig. 10.

In the form of my invention shown in Figs. 2b and 2c, in addition to the other features hereinbefore described, the pigtail is automatically formed integral with the material during the process of manufacture and without the addition of a separate weighted pigtail-shaping member 17. In Fig. 2b the forming element of Fig. 2 is modified by having through the center thereof a hole 18 of suitable size. The lower die is provided with the vertical pin 10, the spring 11 and the adjustable thumb-screw 12 in the same manner as shown in Figs. 3, 4 and 5. In Fig. 2b, however, the hole 18 in the center of the forming element is adapted to be brought into register with the pin 10 when the forming element is in operative position. Under these circumstances, and in the presence of heat and moisture, I have found that the upward force of the pin 10, caused by the spring 11, is sufficient to press the cloth at the point 15 upwardly through the opening 18 by a gradual stretching thereof so that, when the other operations of pulling and pressing and drying have been completed, with suitable lapse of time, and the waste material has been cut away around the slot 8 as hereinabove described, the pin 10 will have been forced upwardly into the position in which it is shown in Fig. 2c, thereby forming the pigtail 19.

The method of operation employed in connection with the form of my invention shown in Figs. 2b and 2c is as follows: The forming element with the cloth blank drawn about it as hereinabove described, is inserted in the machine and the upper and lower dies are brought together as shown in Fig. 2b. At the start of the operation the pin 10 is depressed against the tension of the spring 11 to near the lower limit of its traverse. During the succeeding operations, hereinabove described, the pin 10 commences a gradual upward movement through the opening 18 due to the softening of the cloth under the influence of heat and moisture and its consequent lessened resistance. The constant upward pressure of the pin gradually stretches the cloth more and more till toward the close of the steaming or drying operation, it will be found that the pin 10 has approached the upper limit of its traverse as shown in Fig. 2c. It will be obvious to those skilled in the art that care must be taken to bring the opening 18 into alinement with the pin 10 at the start of the operation, and also that the tension of the spring 11 should be so adjusted, having regard to the weight and quality of the cloth or felt being used, that the cloth will not be injured before it is sufficiently softened and yet will gradually be forced into the position shown in Fig. 2c.

I do not desire to be limited to the specific forms of the device shown in the accompanying drawings and specification, but intend that the same shall embrace all forms of the device falling within the scope of the appended claims.

I claim:

1. An apparatus of the class described comprising a hat forming disk having a central raised portion, said disk receiving a cloth hat blank, a draw-string for contracting the edges of said blank and drawing the same over the top of said raised portion and a pair of heated surfaces between which the cloth hat blank thus held on the forming disk is heated and shaped.

2. The process of making berets consisting of providing a cloth hat blank with a draw-string extending about its edge, in drawing the blank over a circular plate by said draw-string and holding a portion of the blank adjacent to its edge in a position of elevation over and above the upper face of the plate so that the cloth adjacent to the edge of the blank is angularly disposed with respect to the portion of the blank beneath the plate, and in pressing the cloth-covered plate between heated surfaces to cause the cloth to conform to the shape of the plate.

3. An apparatus of the class described, a stand, an open top housing arranged thereon, a forming unit removably positioned within the housing and adapted to be covered with a piece of material from which a beret or cap is to be formed, said forming unit comprising a circular plate having a central upstanding projection, the material covering the bottom of the plate with the edges thereof stretched over the top and said central projection, a ring-like shaping plate positioned over the cloth covered forming unit, means for pressing the shaping plate downwardly on the forming unit around the central projection, and means for heating the material while covering the forming unit and positioned in the housing.

4. An apparatus of the class described, a stand, an open top housing arranged thereon, a forming unit removably positioned within the housing and adapted to be covered with a piece of material from which a beret or cap is to be formed, said forming unit comprising a circular plate having a central upstanding projection, the material covering the bottom of the plate with the edges thereof stretched over the top and said central projection, a ring-like shaping plate positioned over the cloth covered forming unit, means for pressing the shaping plate downwardly on the forming unit around the central projection, and means for heating the material while covering the forming unit and positioned in the housing, said first mentioned means comprising a foot lever operatively connected with the shaping plate, the latter being adapted for vertical movement.

5. The process of making hats which comprises securing a drawstring in slidable relation adjacent the marginal edge of a blank of hat-forming cloth, drawing the blank by means of said drawstring around a forming element, holding the marginal edge of said blank in a position of elevation over a raised annular shaping surface spaced from the marginal edge of said forming element so that the portion of the blank adjacent its marginal edge is angularly disposed with respect to the portion of said blank below said forming element, pressing the blank upon the upper face of said element in the presence of heat and moisture to cause the cloth to conform to the shape thereof and of said annular shaping edge, and cutting away waste material including said drawstring to form a head opening in said hat.

6. The process of making hats which comprises securing a drawstring in slidable relation adjacent the marginal edge of a blank of hat-forming cloth, drawing the blank by means of said drawstring around a forming element, holding the marginal edges of said blank in a position of elevation above a fold-forming member spaced from the marginal edge of said forming element, wetting the blank, pressing the wetted blank upon said fold-forming member in the presence of heat to cause the cloth to conform to the shape thereof, and cutting away the contracted marginal edge of said blank containing said drawstring to form a head-opening in said hat.

7. The process of making hats which comprises affixing a series of cross stitches about the margin of a blank of hat cloth with a slip-cord slidably engaged therewith, drawing and maintaining the blank about a hat-forming element by means of said slip-cord with the margin of said blank in contracted circular position and a portion of the blank surrounding and adjacent to said margin in engagement with a continuous cutting guide, heating the blank to cause it to conform to the shape of the forming element in the presence of moisture, and cutting said blank adjacent said cutting guide to remove the inner contracted portion thereof including said stitches and said slip-cord.

8. The process of making hats which comprises affixing a series of cross stitches adjacent the margin of a blank of hat-forming material with a slip-cord slidably engaged within said stitches, drawing and maintaining the blank by means of said slip-cord about a forming element, tensioning the margin of said blank radially inward from its point of flexure about the periphery of the forming element with a portion of said blank surrounding the contracted margin thereof in position to engage a continuous shaping edge associated with said forming element and intermediate the center and the periphery thereof, deflecting a portion of said blank adjacent said shaping edge in the presence of heat and moisture to cause the blank to engage said edge and to receive an impression therefrom, and cutting the blank along a path adjacent said impression to remove waste material containing said stitches and to form a head opening in the finished hat.

9. The process of making hats which comprises affixing a series of cross stitches adjacent the margin of a blank of hat-forming material with a slip-cord slidably engaged within said stitches, drawing and maintaining the blank by means of said slip-cord about a hat-shaping element, tensioning the margin of said blank radially inward from its point of flexure about the periphery of said hat-shaping element with a portion of said blank surrounding the contracted margin thereof covering a continuous shaping edge forming a part of said hat-shaping element and intermediate the center and the periphery thereof, applying heat to the blank in the presence of moisture to drive out moisture therefrom and to cause the blank to conform to the shape of the hat-shaping element and to receive a mark from said edge as said moisture is driven out, and cutting away waste material adjacent said mark and containing said stitches to form a head opening in the finished hat.

10. In a machine for making hats, in combination, a hat-forming element, a raised annular shaping edge integral with one face of said element and spaced from the periphery thereof, means for drawing and maintaining a hat blank in position about said forming element with the marginal edges of said blank extended over said raised annular shaping edge, said means comprising a shirring string extending about the edge of said hat blank, and means for shaping the blank on the forming element so that it will conform to the shape thereof and of said annular shaping edge.

11. In a machine for making hats, in combination, a hat-forming disk having a central raised portion, said disk receiving a cloth blank, a drawstring for contracting the edges of said blank and drawing the same over the top of said raised portion and means for shaping the blank on the former so that it will conform to the shape thereof and of said raised portion in the presence of heat and moisture.

12. An apparatus of the class described having a hat former composed of a flat member having a central elevated part, means for drawing and maintaining a hat blank in stretched condition about said former with a part of said hat blank extended over the elevated part, said means comprising a shirring string extending about the edge of said hat blank, and means for shaping the blank on the former so that it will conform to the shape of the same.

13. In a machine for making hats, in combination, a hat-forming element, a continuous circular line-defining shaping edge spaced inwardly from the periphery thereof, means for drawing and maintaining a hat blank in position about said forming element with the marginal edges of said blank extended over said shaping edge, said means comprising cross stitches secured to the blank adjacent the marginal edge thereof and a slip-cord slidably engaged within said stitches, means movable relative to said shaping edge to bring a portion of said blank into engagement therewith, and heating means associated with said hat-forming element for driving moisture from said blank while maintained in position about said element to cause said blank to conform to the shape of said element and to receive an impression from said edge.

14. In a machine for making berets, an upper die having a central opening through which the material is pulled, a shaping element having a central opening, a lower die, a yieldably supported pin extending upwardly within the central openings of the upper die and the forming element, means cooperative with the pin to form a pigtail in the presence of heat and moisture, and means to heat one die.

15. In a machine for making berets, a forming element having a central opening and a circular upstanding wall concentric therewith, an upstanding yieldably supported pin arranged to penetrate the plane of the lower face of said forming element when in operative position and to project through the central opening thereof, and means cooperative with said pin to form a pigtail.

16. The steps in the method of manufacturing berets by means of a disc-shaped forming element in the presence of heat and moisture which comprise stitching a slip cord around the periphery of the cloth blank, drawing the cloth blank around the forming element, subjecting the forming element to the action of heat in the presence of moisture, and at the same time forming a pigtail integral with the material of the beret.

17. In a hat-forming machine, in combination, a member having a shaping surface, a second member having a shaping surface for cooperation therewith, the material of a hat blank being positioned between said surfaces and shaped thereby, a pin projecting above the shaping surface of one of said members, the other of said members being formed with an aperture, and yielding means for urging said pin to enter said aperture and thereby to form a pigtail in the hat blank.

18. In a hat-forming machine, in combination, a member for shaping a hat, a second member for cooperation therewith, the material of a hat blank being positioned between said members, a yieldably supported pin projecting above the surface of one of said members, and cooperating means in the other of said members for engaging a portion of a hat blank positioned between said members for shaping the same over said pin to form a pigtail integral with said blank.

VICTOR P. WRITER.